US011018955B2

(12) United States Patent
Bagarolo et al.

(10) Patent No.: US 11,018,955 B2
(45) Date of Patent: May 25, 2021

(54) CHANGE MANAGEMENT OPTIMIZATION IN CLOUD ENVIRONMENT

(71) Applicant: International Business Machines Corporation, Armonk, NY (US)

(72) Inventors: Antonio Bagarolo, Rome (IT); Antonio Di Cocco, Rome (IT); Luigi Pichetti, Rome (IT); Paolo Ottaviano, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/451,641

(22) Filed: Jun. 25, 2019

(65) Prior Publication Data

US 2020/0412625 A1    Dec. 31, 2020

(51) Int. Cl.
  *G06F 15/173* (2006.01)
  *H04L 12/24* (2006.01)
  *H04L 29/08* (2006.01)
  *G06N 20/00* (2019.01)

(52) U.S. Cl.
  CPC ......... *H04L 41/5045* (2013.01); *G06N 20/00* (2019.01); *H04L 67/10* (2013.01)

(58) Field of Classification Search
  CPC .................. H04L 41/5045; G06N 20/00
  See application file for complete search history.

(56) References Cited

U.S. PATENT DOCUMENTS

| 6,578,005 | B1 | 6/2003 | Lesaint |
| 7,950,007 | B2 | 5/2011 | Mohindra |
| 8,069,242 | B2 | 11/2011 | Hadar |
| 8,276,152 | B2 | 9/2012 | Ashvinkumar |
| 8,285,827 | B1* | 10/2012 | Reiner ................. G06F 9/50 709/223 |
| 9,380,076 | B1* | 6/2016 | Juvekar .............. H04L 63/101 |
| 9,736,038 | B2 | 8/2017 | Finn |
| 10,445,170 | B1* | 10/2019 | Subramanian ......... G06N 7/005 |
| 10,581,851 | B1* | 3/2020 | File ..................... G06K 9/6224 |
| 2017/0032268 | A1 | 2/2017 | Rajmohan |
| 2018/0165084 | A1* | 6/2018 | Mahimkar .......... G06F 9/45558 |
| 2019/0164100 | A1* | 5/2019 | Rotta .................... G06N 20/00 |

(Continued)

OTHER PUBLICATIONS

UNISYS "*How to Effectively Optimize Change Management*" Edge Service Management by UNISYS, www.unisys.com/itsm.

(Continued)

*Primary Examiner* — Hee Soo Kim
(74) *Attorney, Agent, or Firm* — Christopher Pignato; George S. Blasiak; Heslin Rothenberg Farley & Mesiti PC

(57) ABSTRACT

Methods, computer program products, and systems are presented. The methods include, for instance: building a change management meta model on relationships between change request tasks of a change request and logical components of a computing environment via deployment processes that realizes respective change request tasks onto the logical components. A change request fulfillment plan that minimizes a maintenance window for deploying the change request tasks to the logical components is produced. After deployment, performance metrics of the logical components updates change request constraints.

20 Claims, 9 Drawing Sheets

(56) References Cited

U.S. PATENT DOCUMENTS

2020/0034135 A1* 1/2020 Shi .......................... G06N 5/04

OTHER PUBLICATIONS

K. Terrell "*Managing Organizational Change in Operational Change Initiative*", www.imanet.org/thought_leadership Jan. 2015.
R. Thimmaiah "*How to Manage Change Management Process in Cloud*" https://www.mindtree.com/blog/how-manage-change-management-process-cloud, Nov. 2, 2017.
P. Mell, et al. "*The NIST Definition of Cloud Computing*", NIST Special Publication 800-145, Sep. 2011, Gaithersburg, MD.

* cited by examiner

CHANGE MANAGEMENT OPTIMIZATION IN CLOUD ENVIRONMENT

TECHNICAL FIELD

The present disclosure relates to system test service, and more particularly to methods, computer program products, and systems for optimizing change management for cloud computing environments.

BACKGROUND

Conventional cloud management functionalities are numerous and performed within a limited time window as agreed with the cloud customers, in order to keep the level of disruption to subscribed service within the range of the service level agreements. Cloud computing environments often service time-critical transaction services for the cloud customers, thus efficient cloud management platforms/tools are indispensable in managing modern cloud computing environments for the cloud customers. Typical cloud computing management functionalities include provisioning and orchestration of resources, workflows and/or workloads services, automation and deployment of application services via DevOps model, security on access and enforcing compliance to regulations, service request fulfillment and deployment of cloud resources for providing subscribed services, performance and availability metrics monitoring and logging, automating incident management and log aggregation, inventory and classification of pre-existing cloud resources as well as to monitor and to manage changes, cost management and performance optimization, and other maintenance items such as migration, backup, and data protection.

SUMMARY

The shortcomings of the prior art are overcome, and additional advantages are provided, through the provision, in one aspect, of a method. The method includes, for instance: building, by one or more processor, a change management meta model on interdependencies between a change request including one or more change request task and one or more deployment process respective to each of the one or more change request task, and on dependencies of one or more logical component of a computing environment to the one or more deployment process based on change request constraints by use of machine learning; producing, by the one or more processor, a change request fulfillment plan that minimizes a maintenance window indicating an amount of time for deploying the one or more change request task to the one or more logical component via the one or more deployment process based on the interdependencies and the dependencies modeled in the change management meta model; and feeding, by the one or more processor, performance metrics on operations of the one or more logical component subsequent to deploying the one or more change request task into the change request constraints.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
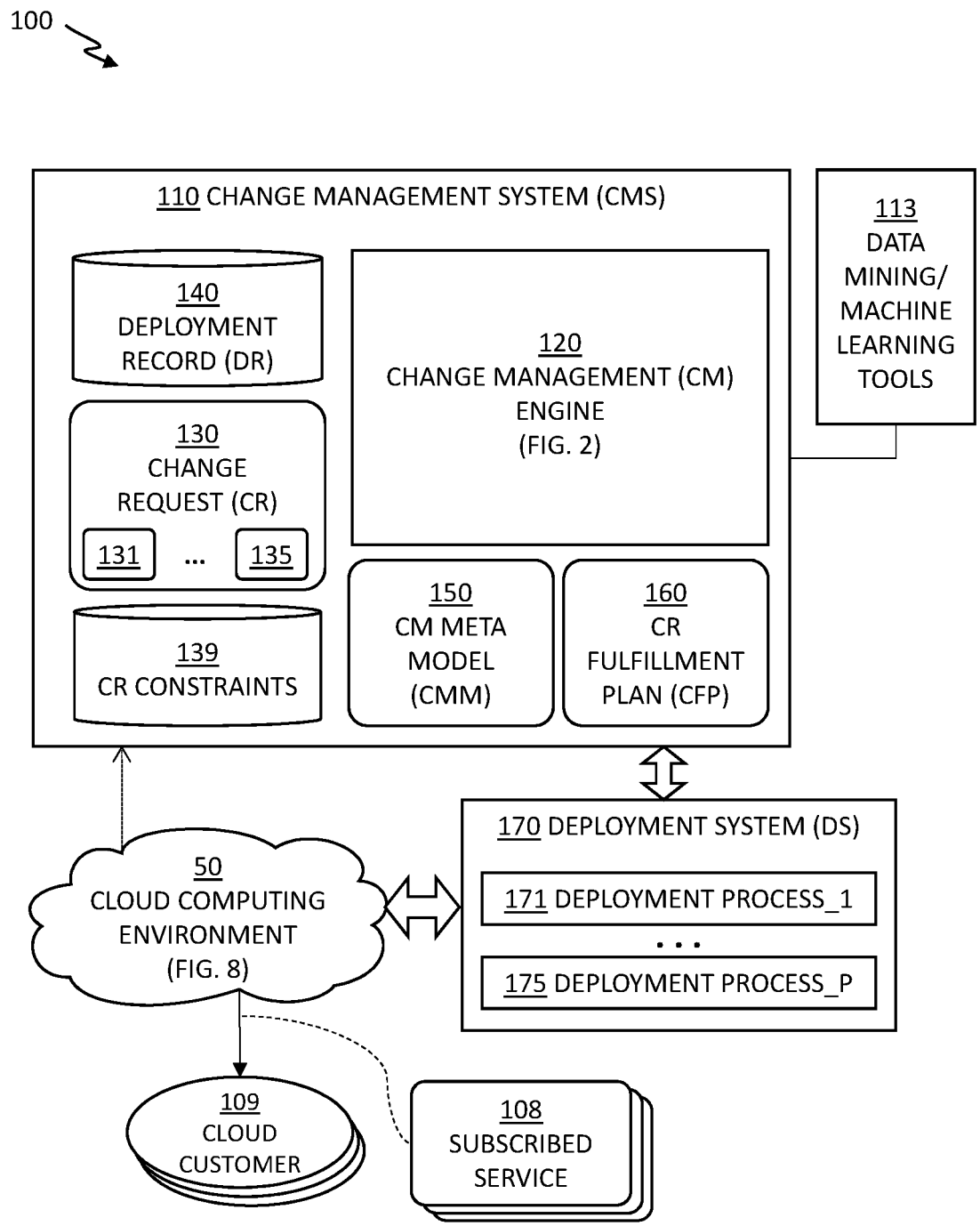
FIG. 1 depicts a system for optimizing a change management for a cloud computing environment, in accordance with one or more embodiments set forth herein.

FIG. 1 depicts a system 100 for optimizing a change management for a cloud computing environment 50, in accordance with one or more embodiments set forth herein.

Conventionally, cloud management platforms and tools utilizes technical solutions combining software and hardware resources in order to meet challenges in managing cloud computing environments. Conventional cloud management platforms and tools include, in general, tools native to a certain public cloud providers and third-party tools that are designed to provide consistent functionality across multiple cloud providers. For typical cloud computing environments, a cloud management platform and/or tool that balances consistent performance of management tasks across different cloud platforms with efficient access to various native functionalities within individual cloud platforms would be desirable. Particularly with the growth in usage of public cloud and/or the increase in multi-cloud usage, consistent cross-platform management of cloud computing environments would be an increasingly more significant role of any cloud management platform/tool that services wide range of cloud customers.

Cloud computing environments often service time-critical transaction services for cloud customers according to a Service Level Agreement (SLA), which strictly limits the amount of downtime. In order to provide the cloud services pursuant to the SLA, cloud providers need to perform numerous management tasks within the agreed downtime, with notice to the cloud customers. Accordingly, efficient cloud management platforms/tools are indispensable in managing modern cloud computing environments. In this specification, typical cloud computing management functionalities include, but not limited to: provisioning and orchestration of resources, workflows, and/or workloads; automation enabling cloud consumption and deployment of application services via Infrastructure-as-code and other DevOps concepts; security and compliance in managing rule-based access of cloud services and enforcing security configurations; service request fulfillment in collecting and accomplishing requests from cloud customers on access and deployment of cloud resources with respect to subscribed services; monitoring and logging in collecting performance and availability metrics as well as automating incident management and log aggregation; inventory and classification to discover and to maintain pre-existing brownfield cloud resources as well as to monitor and to manage changes; cost management and optimization of capacity and scale of cloud based on actual processing demand; and migration, backup, and disaster recovery (DR) enabling data protection, and data mobility via snapshots and/or data replication.

IT change management is a process designed to understand and minimize risks while making IT changes in a target computing environment. Businesses have two main expectations of the services provided by IT: (a) the services should be stable, reliable, and predictable; and (b) the services should be able to change rapidly to meet evolving business requirements as well as the evolving technical landscape.

Embodiments herein recognize that these expectations for change management are sometimes in conflict. Moreover, the adoption of dynamic DevOps cloud delivery models, along with solutions whose architecture is evolving toward loosely coupled components and micro services, is providing additional challenges to efficiency of the change management process.

The objective of change management is to enable IT service management to meet both of aforementioned expectations and to enable rapid changes while minimizing the possibility of disruption to services provided by the target computing environment.

Typical issues with respect to the change management processes of multi-tenant cloud environments arise because of backend supporting services that are mostly invisible to neither entities maintaining the cloud nor the cloud customers. For example, a schedule for the changes can be agreed upon by the cloud customers in a certain window of time as defined by the cloud customers. However, because the maintaining entities of the target computing environment responsible for the various change processes often deal with many distinctive domains across wide geographical area including many countries and/or time zones, and because it is often the case that more than one entity is involved in the change process and that one such maintaining entity does not know about the other maintaining entities, it is difficult for all actors in the change process to agree with either an exact window of time for change or a consistent set of tasks subject to the change.

Because of the aforementioned challenges, scheduling for changes in multi-tenant cloud environment is time consuming and error-prone. Further, as the multi-tenant cloud environment is often provides time-critical services or the computing environment can be vulnerable in terms of security while undergoing the change process, it is desirable to minimize the duration of service disruption, that is, the maintenance window, while delivering the same changes. Also, as a plurality of entities are involved in maintaining the infrastructure of the multi-tenant cloud environment, the schedule for delivering the change process has to be pre-arranged and agreed across all of the entities supporting the multi-tenant cloud environment.

The system 100 includes a change management system (CMS) 110, a deployment system (DS) 170, and the cloud computing environment 50. In this specification, the cloud computing environment 50 refers to a multi-tenant, public cloud infrastructure, according to the Deployment Models of cloud computing environments based on cloud infrastructure location as presented in FIGS. 7-9 and corresponding descriptions. In the present specification, the term "deployment" as used in the deployment system 170 and the deployment processes 171, 175, which is distinctive from the usage in the aforementioned Deployment Models, indicates a realization of a technical specification or algorithm as a program, software component, or other computer system through computer programming and execution thereof, including, but not limited to, an installation/distribution and running of software program tools.

The CMS 110, the DS 170, and the cloud computing environment 50 are operatively coupled with one another via communication network channel. Each of the CMS 110, the DS 170, and the cloud computing environment 50 can be provided and maintained by respective entities and organizations and can be physically present across wide geographical areas and different time zones. The diversity and complexity of interoperations amongst the CMS 110, the DS 170, and the cloud computing environment 50 present challenges in change management and in scheduling such changes even for a single cloud customer 109 in the cloud computing environment 50.

The CMS 110 is a component that manages, models, plans for optimized scheduling of changes, and tracks the changes so deployed to the cloud computing environment 50. In one embodiment of the present invention, the CMS 110 can be implemented as a component of a cloud management platform/tool on the one or more cloud computing environment 50.

The deployment system 170 realizes the changes as scheduled by the CMS 110 on the one or more cloud computing environment 50 by performing respective deployment processes in a predefined sequence on logical components of the one or more cloud computing environment 50. In this specification, the term "logical component" indicate any identifiable unit component of the cloud computing environment 50 that can be distinguished from other component, including, but not limited to, a software program/suite, a piece of equipment/part/resource, or any other identifiable part of the cloud computing environment 50 that is logically distinctive from the perspective of the change management process. The one or more cloud computing environment 50 services one or more cloud customers 109 with one or more subscribed service 108 according to respective Service Level Agreements. Details of the one or more cloud computing environment 50 are presented in FIG. 8 and corresponding description.

The CMS 110 includes a change management (CM) engine 120, one or more change requests 130, change request constraints 139, a deployment record 140, a change management meta model (CMM) 150, and a change request fulfillment plan (CFP) 160. The CMS 110 is operatively coupled to data mining/machine learning tools 113 for data collection, analytics, and modeling. The data mining tool 113 is a data crawler that continuously collects information such as operation records, performance metrics, deployment records, change request and change plan histories, from other instances of the CMS 110, the DS 170, and the one or more cloud computing environment 50 as well as any other data sources that provide information relevant to the change requests 130.

The CM engine 120 operates in four phases of learning, modeling, planning, and monitoring. In the learning phase, the CM engine 120 collects information pertinent to cloud operations from one or more cloud computing environment 50. In the modeling phase, the CM engine 120 builds the CMM 150 based on the information collected in the learning phase as well as custom constraints defined by cloud customers 109 and/or third party systems. In the planning phase, the CM engine 120 produces the CFP 160 by use of the CMM 150, in a manner that maximizes the number of changes realized in a unit time and that minimizes service disruption for the cloud customers 109, and the CM engine 120 subsequently deploys the CFP 160 by use of the DS 170. In the monitoring phase, the CM engine 120 collects data on the performance of the CFP 160 from the operations of the cloud computing environment 50, and retrains the CMM 150 for reinforcement and/or dynamically adjusts the CFP 160 if necessary and applicable. Detailed operations of the CM engine 120 are presented in FIG. 2 and corresponding description.

The CM engine 120 collects information on the change requests 130 and specifies change request tasks 131, 135 that are part of each change request 130. In order to fulfill the change request 130, a series of change request tasks 131, 135 is to be accomplished by the deployment system 170 onto the cloud computing environment 50. The CM engine 120 further collects information on respective change request tasks 131, 135 as specified. Each of the change requests 130 as well as the change request tasks 131, 135 of the change request 130 are specified with respective sets of the change request constraints 139.

The system 100 can further include a plurality of cloud management systems, deployment systems, and cloud computing environments, to which the CMS 110 has access for data mining and information gathering, particularly with respect to information useful for extracting the change request constraints 139 for the CMM 150, such as change request histories and deployment records of respective components.

In certain embodiments of the present invention, the change request 130 can be specifically directed to a certain portion/functionality of the cloud computing environment 50, a particular software/tools/hardware resources or any other logical components, a set of virtual machines in the cloud computing environment 50 for a particular cloud customers 109.

The CM engine 120 sets the change request constraints 139 corresponding to the change request 130 based on the information collected by the data mining tool 113 respective to each of the change requests 130 as well as service level agreements with the cloud customers 109 and/or past maintenance histories. For example, the CM engine 120 would obtain a permitted maintenance window on the SLA, and current status of maintenance record for a specific customer and/or for a particular cloud service by data mining on other management components of the CMS 110 with respect to the cloud computing environment 50. The CM engine 120 can obtain further information of the change request constraints 139 on user-defined conditions as provided by the one or more cloud customers 109.

The change request constraints 139 describes interdependencies, or lack thereof, amongst the change request tasks 131, 135 of the change request 130, deployment processes 171, 175 of the deployment system 170 that implement the changes to the cloud computing environment 50, and logical components of the cloud computing environment that are affected by the change request 130.

Embodiments of the present invention recognize that dependencies dealt in the CR constraints 139 indicate a circumstances in which a software application requires another software application to operate, as often with software programs sharing code libraries, device drivers, and other system environments. The software application would not run at all, behave abnormally, or fail in particular functionality without properly satisfying the dependencies of the software application. In this specification, term "interdependency" indicates a web of dependencies amongst multiple software applications/processes/logical components of the CMS 110, the DS 170, and the cloud computing environment 50, particularly with respect to a sequence of execution in parallelism.

The CM engine 120 builds the change management meta model (CMM) 150 based on the information collected during learning. The CMM 150 is based on the change request constraints 139 describing the aforementioned interdependencies amongst elements of the CMS 110, the DS 170, and the cloud computing environment 50. The CMM 150 represents how implementing the change specified by the change request 130 on the cloud computing environment 50 affects the subscribed services 108 on the cloud computing environment 50 for the cloud customer 109, by specifying respective logical components of the cloud computing environment 50 that are affected. Subsequent to deployment of the change request 130, the CM engine 120 retrains the CMM 150 with monitored data from the cloud computing environment 50 on operations and activities with respect to the deployed change request 130, affected logical components in the cloud computing system 50, and the effectiveness of the previous instance of the CMM 150 and the change request fulfillment plan 160 therefrom. By retraining the CMM 150 with the monitored data, the interdependencies/correlations modeled in the CMM 150 can be reinforced with supporting updates or regress with contradicting updates. In this specification, terms "change request fulfillment plan" and "change plan" can be used interchangeably. In addition to the change request constraints 139, the CMM 150 also includes custom constraints on aspects including, but not limited to, modeling and retraining policy, priorities on certain logical components in general, priorities on certain logical components of a particular cloud computing environment, priorities on a particular cloud customer and/ or a specific cloud service.

Based on a combination of the CMM 150 and the deployment record 140, the CM engine 120 subsequently produces the change request fulfillment plan 160 corresponding to the change request 130. The change request fulfillment plan 160 is an optimized execution sequence for the deployment processes 171, 175 that performs the change request tasks 131, 135.

As noted, the deployment system 170 implements the change requests 130 as scheduled by the CMS 110 on the cloud computing environment 50, by performing deployment processes 171, 175 of the deployment system 170. The change request tasks 131, 135 of the change request 130 respectively correspond to subsets of the deployment processes 171, 175 of the deployment system 170, and each of the change requests 130 is implemented by executing the deployment processes 171, 175 corresponding to the change request tasks 131, 135 of the change request 130 in a sequence optimized to minimize downtime for the cloud computing environment 50 and consequently minimizes disruption on the subscribed services 108 for the cloud customers 109 while performing the change requests 130 properly based on interdependencies between the change request tasks 131, 135, the deployment processes 171, 175, and the logical components of the cloud computing system 50, as presented in the change request constraints 139 modeled in the CMM 150.

In the change request fulfillment plan 160, the interdependencies between the change request tasks 131, 135 and the affected logical components of the cloud computing environment 50 are mediated by the respective deployment processes 171, 175. Accordingly, the change request fulfillment plan 160 can also be presented as a combination of the change request tasks 131, 135 and respectively corresponding logical components of the cloud computing environment 50 that are affected by the respective change request tasks 131, 135.

The CM engine 120 monitors the operations of the cloud computing environment 50 after the deployment of the change request fulfillment plan 160, when the change request 130 is implemented. The CM engine 120 updates the change request constraints 139 according to the changed conditions in the cloud computing environment 50, and subsequently trains the CMM 150 with the updated change request constraints 139 in order to accurately service a next change request with the CMM 150.

Embodiments of the present invention optimizes the change management by manipulating the maintenance window to complete the changes requests 130 in a shortest amount of time by parallelly processing certain change request tasks 131, 135 in a manner that causes the least disruption with the subscribed service 108 on the cloud computing environment 50 for the cloud customers 109, by machine learning of correlations/interdependencies amongst the change request tasks 131, 135 of the change request 130, respective deployment processes 171, 175 of the deployment system 170, and the logical components of the cloud computing environment 50 that are affected by the change requests 130, as identified from the change request constraints 139 modeled in the CMM 150.

Figure 2:
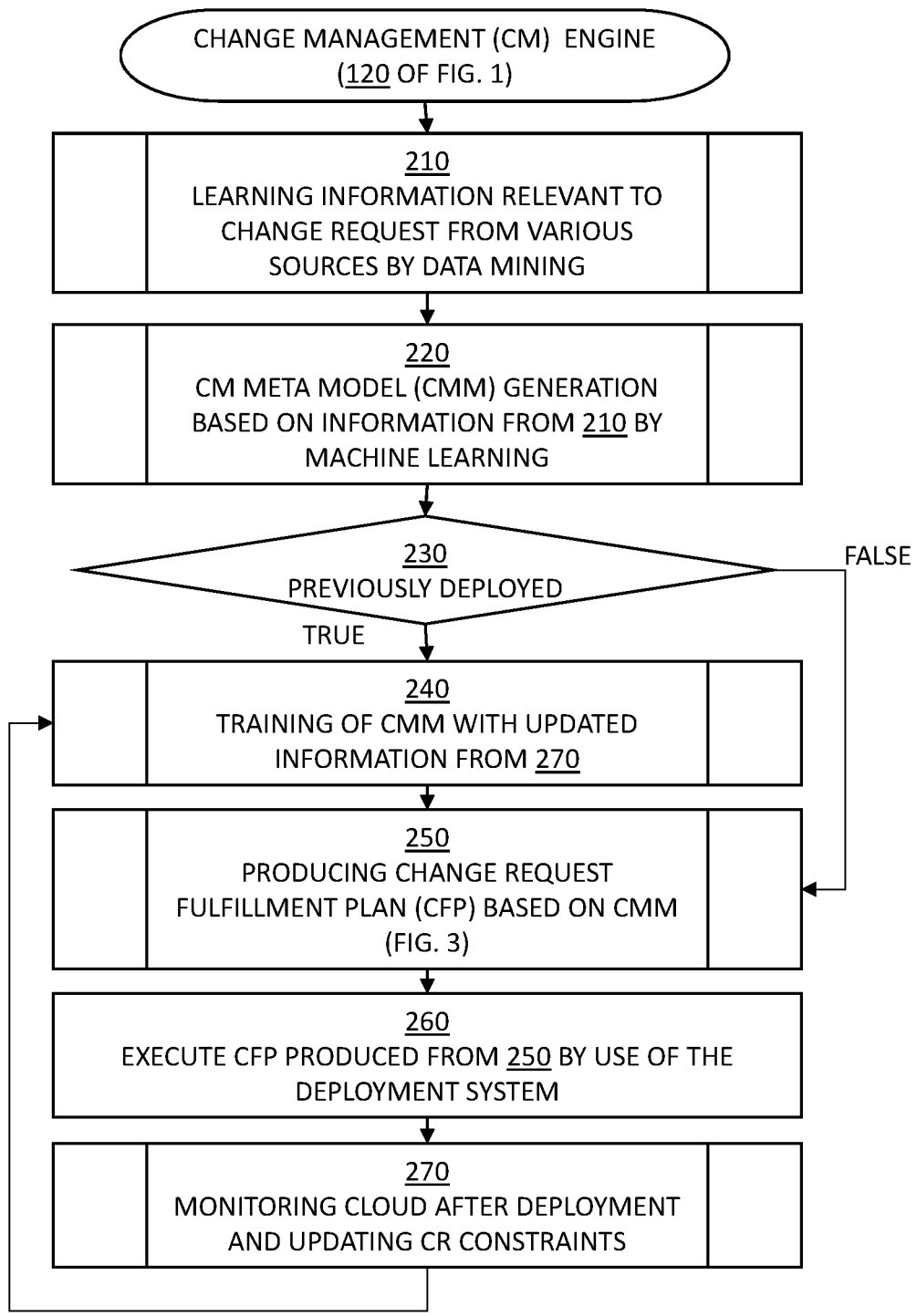
FIG. 2 depicts a flowchart of operations performed by the change management engine of the change management system in FIG. 1, in accordance with one or more embodiments set forth herein.

FIG. 2 depicts a flowchart of operations performed by the change management engine 120 of the change management system 110 in FIG. 1, in accordance with one or more embodiments set forth herein.

As noted, the CM engine 120 operates in the phases of learning, modeling, planning, and monitoring. Block 210 represents the learning phase, in which the CM engine 120 collects information pertinent to cloud operations from one or more cloud computing environment 50. Block 220 represents the modeling phase, in which the CM engine 120 builds the change management meta model 150 based on the information collected in block 210 as well as custom constraints defined by cloud customers 109 and/or third party systems. Block 250 represents the planning phase, in which the CM engine 120 produces the change request fulfillment plan 160 by use of the CMM 150 built in block 220, in a manner that maximizes the number of changes realized in a unit time and that minimizes service disruption for the cloud customers 109. Blocks 270 and 240 represents the monitoring phase, in which the CM engine 120 collects data on the performance of the CFP 160 from the operations of the cloud computing environment 50 after deploying the CFP 160, and retrains the CMM 150 and/or dynamically adjusts the CFP 160, respectively. In certain embodiments of the present invention, each block is implemented respective subprocesses that accomplishes the functions of each block as a combination.

In block 210, the CM engine 120 collects information for extracting the change request constraints 139 in order to build the CMM 150. The CM engine 120 collects information including, but not limited to, specifications on multiple instances of the change request 130 as well as operations of and/or interactions between multiple instances of the CMS 110, the DS 170, and the cloud computing environment 50 by data mining upon other systems for change management and subject cloud environments. The CM engine 120 utilizes the data mining tool 113 that collects information such as change request and change plan histories, deployment records, operation records, performance metrics, and any information relevant to fulfilling the change request 130 from other instances of the CMS 110, the DS 170, and the one or more cloud computing environment 50. Then, the CM engine 120 proceeds with block 220.

In certain embodiments of the present invention, the CM engine 120 specifies change request tasks 131, 135 from the change request 130 based on the information collected. The change request tasks 131, 135 are respective parts of each change request 130, which should be performed in a particular sequence in order to implement the change request 130. The CM engine 120 can further collects information on individual change request tasks 131, 135. Each of the change requests 130 as well as the change request tasks 131, 135 of the change request 130 are specified with respective sets of the change request constraints 139.

In certain embodiments of the present invention, the change request 130 can specifically focus on a certain cloud customer and/or a cloud service of the cloud computing environment 50, a particular software/tools/hardware resources or any other logical components in the cloud computing environment 50, a particular set of virtual machines corresponding to certain cloud customers 109, based on the characteristics of the change request 130.

In certain embodiments of the present invention, the CM engine 120 sets the change request constraints 139 corresponding to the change request 130 based on the collected information respective to each of the change requests 130 as well as service level agreements with the cloud customers 109 and/or past maintenance histories. In the same embodiments as above, the CM engine 120 would obtain a permitted maintenance window on the SLA, and current status of maintenance record for a specific customer and/or for a particular cloud service by data mining on other management components of the CMS 110 with respect to the cloud computing environment 50. The CM engine 120 can obtain further information of the change request constraints 139 on user-defined conditions as provided by the one or more cloud customers 109.

In certain embodiments of the present invention, the CM engine 120 builds the change request constraints 139 based on data collected during the learning phase of block 210. A few examples of the collected data items include, but are not limited to: plannedStart of the timestamp type representing a time set for a change to begin; plannedEnd data of the timestamp type representing a time set for the change to end; actualStart of the timestamp type representing a time when the change began; actualEnd of the timestamp type representing a time when the change ended; customerApproval of the Boolean type representing whether or not the cloud customer approved the change; componentAffected of the list type representing components of the cloud computing environment that are affected by the change; isDisruptive of the Boolean type representing whether or not the change is disruptive to the subscribed services 108; disruptionDuration of the numeric type representing a period of time of the service disruption, if any; changeProcessList of the list type representing deployment processes to implement the change; changeOwner of the text type representing an entity who causes the change; targetEnvironments of the list type representing all cloud computing environments that are affected by the change; numberAndTypeVmEnvironment of the list type representing the virtual machine components of the cloud computing environment that are affected by the change; customer Window Start of the timestamp type representing a time set for the change to begin by the cloud customer; customerWindowEnd of the timestamp type representing a time set for the change to end by the cloud customer; freezeWindowStart of the timestamp type representing a time set by the cloud customer for the disrupted services to pause; freezeWindowEnd of the timestamp type representing a time set by the cloud customer for the disrupted services to resume; componentName of the text type representing a component having an incident; componentIssueDescription of the text type representing an issue with the component of the componentName with respect to the incident; componentIssueStart of the timestamp type representing a time when the issue occurred; componentIssueEnd of the timestamp type representing a time when the issue terminated; precheckProcessList of the list type representing the deployment processes to check prior to deploying the change; and postcheckProcessList of the list type representing the deployment processes to check after deploying the change.

Figure 4:
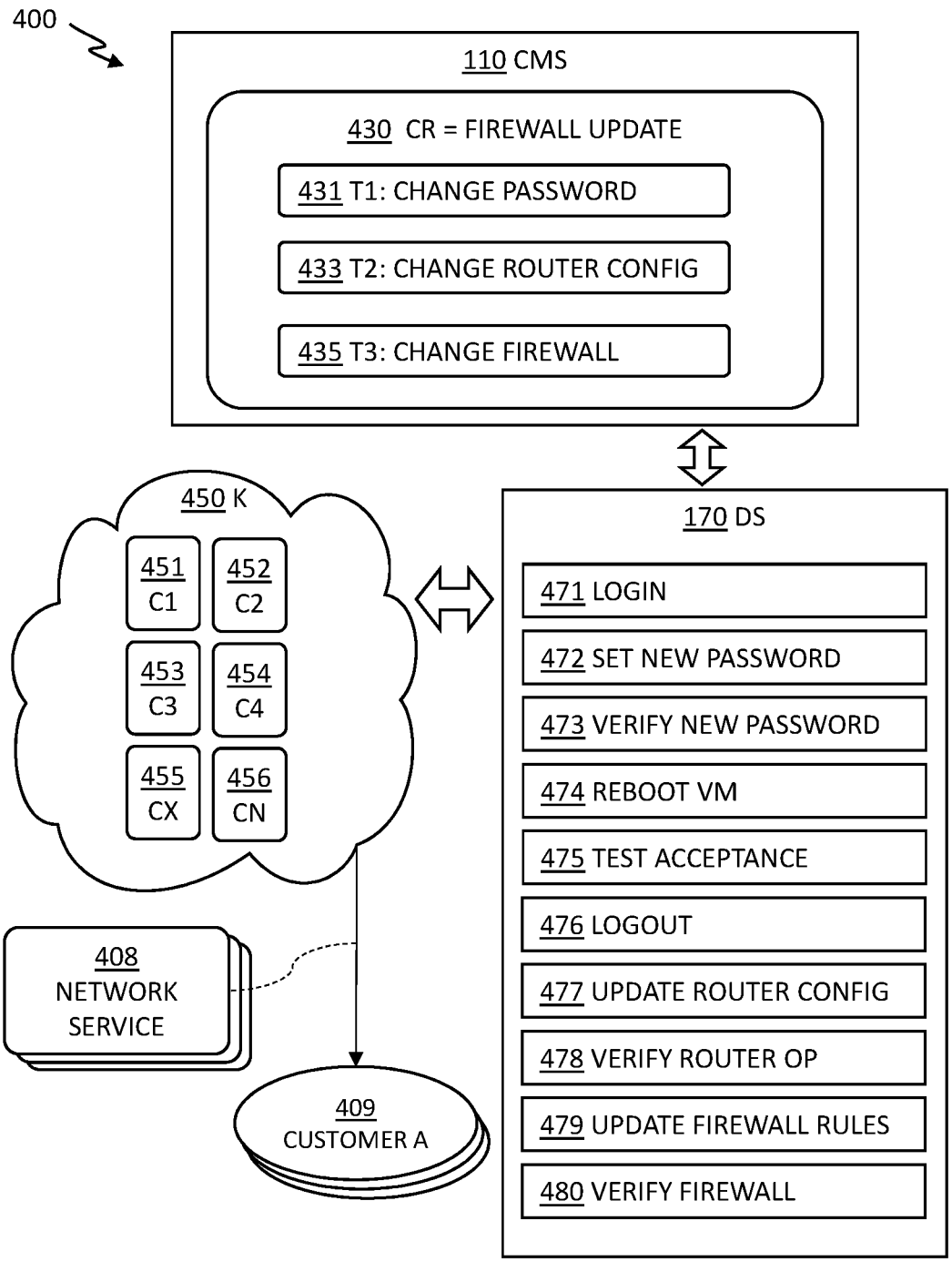
FIG. 4 depicts an exemplary instance of respective elements from the CMS, the DS, and the cloud computing environment of FIG. 1, in accordance with one or more embodiments set forth herein.

An example of respective elements from the CMS 110, the DS 170, and the cloud computing environment 50 is presented in FIG. 4 and corresponding description.

In block 220, the CM engine 120 compiles the change request constraints 139 from the information collected from block 210, and subsequently builds the change management metal model 150 with the CR constraints 139 by use of machine learning. Then, the CM engine 120 proceeds with block 230.

As shown in the examples of collected data in block 210 above, the information collected from block 210 is heterogeneous and not usable as is. The CM engine 120 identifies which deployment processes 171, 175 from the deployment system 170 are to be performed to implement the change request 130, and which logical components of the cloud computing environment 50 are to be affected by the change request 130 when deployed, by use of a combination of various lists of components and processes appearing in the information collected in the learning phase of block 210. The CM engine 120 also identifies the various time stamp data for scheduling the actual change within a window of time approved by the cloud customers 109. As certain changes can be implemented continuously or as a set of progressive steps in a pipeline environment, the CM engine 120 can further take the characteristics of the change request 130 and the deployment details into account in building the CMM 150. The CM engine 120 models the interdependencies amongst the change request tasks 131, 135 of the CMS 110, the deployment processes of the DS 170, and a set of logical components of the cloud computing environment 50, that are relevant to the change request 130 into the CMM 150 by machine learning via the machine learning tools 113.

In certain embodiments of the present invention, the CMM 150 is a structured data set describing interdependencies amongst respective sets of elements of the CMS 110, the DS 170, and the cloud computing environment 50 with respect to sequential processing or parallel processing availabilities in implementing the change request 130.

In certain embodiments of the present invention, the CM engine 120 can further integrates user-defined constraints from the cloud customers 109 on the change request 130 with the data collected from the learning phase in block 210 into the CMM 150, such that the CMM 150 can produce the CFP 160 that satisfies not only the operational interdependencies amongst the elements but also the requirements of the cloud customers 109 in implementing the change request 130.

Figure 5:
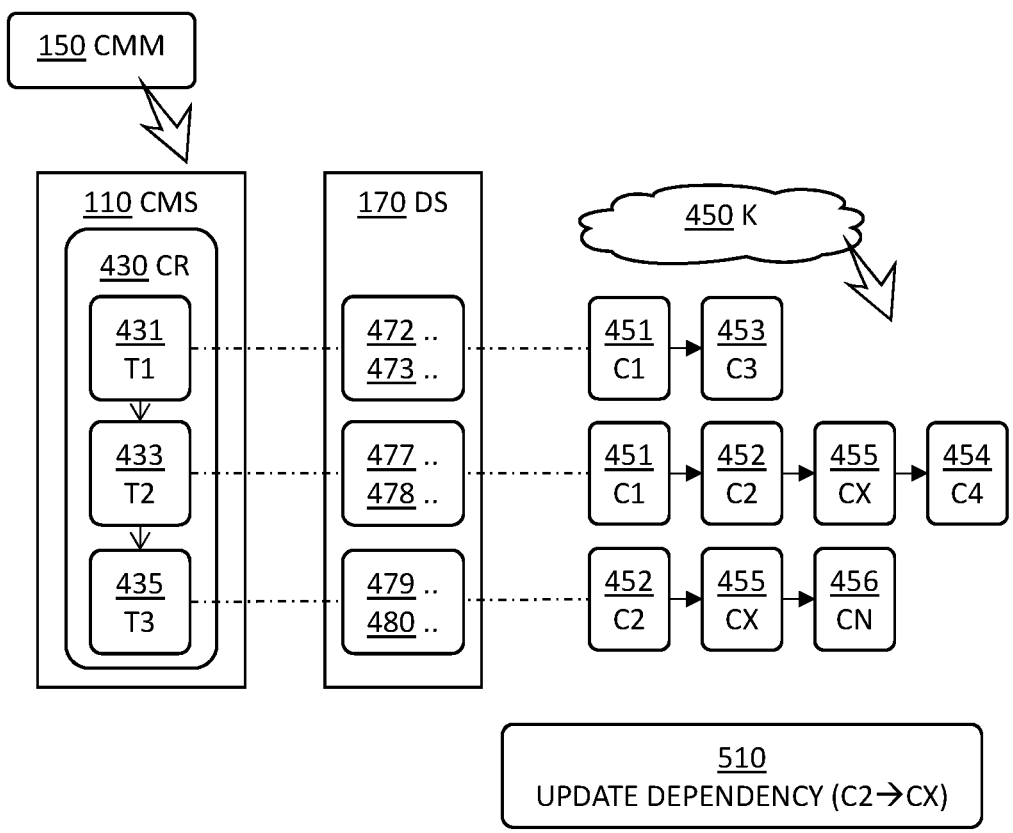
FIG. 5 depicts an exemplary instance of the change management meta model corresponding to the elements shown in FIG. 4, in accordance with one or more embodiments set forth herein.

An exemplary instance of the CMM 150 corresponding to the elements of FIG. 4 is presented in FIG. 5 and corresponding description.

In block 230, the CM engine 120 determines whether or not the change request 130 had been previously deployed in any cloud computing environment subject to data mining. If the CM engine 120 determines that the change request 130 had been previously deployed, then the CM engine 120 proceeds with block 240. If the CM engine 120 determines that the change request 130 had not been previously deployed, indicating that the CMM 150 needs no further training from the previous deployment, then the CM engine 120 proceeds with block 250.

In block 240, the CM engine 120 retrains the CMM 150 and/or dynamically adjusts the CFP 160 based on the deployment record 140 from previous and/or ongoing changes according to the change request 130 and the CFP 160. The CM engine 120 performs block 240 as a part of the monitoring phase subsequent to block 270.

In certain embodiments of the present invention, the deployment records 140 include, but are not limited to, details on past change requests, change request fulfillment plans corresponding to respective change requests, change request tasks, deployment processes, and cloud components that had been affected by the respective past change requests, actual maintenance window and duration, service disruption and duration, performance metrics after the deployment. The CM engine 120 integrates all available information of the deployment records 140 of the previous/ongoing deployment of past change requests to the CMM 150, such that the CMM 150 effectively represents the interdependencies amongst the subject components and processes without oversight.

In block 250, the CM engine 120 produces the change request fulfillment plan 160 from the CMM 150 resulting from either initially block 220 or block 240 after retraining. As noted, block 250 represents the planning phase. The CM engine 120 produces the change request fulfillment plan 160 to effectively fulfill the change request 130 in a shortest possible time and with the least service disruption for the cloud customers 109. Detailed operations of block 250 of the CM engine 120 in producing the change request fulfillment plan 160 are presented in FIG. 3 and corresponding description. Then, the CM engine 120 proceeds with block 260.

In certain embodiments of the present invention, the CM engine 120 generates the CFP 160 as a set of schedules when to begin a certain set of deployment processes 171, 175 of the deployment system 170. The change request tasks 131, 135 of the change request 130 are initially sequential in the change request constraints 139, as performed one after another in the change request 130. The change request tasks 131, 135 respectively correspond to a subset of the deployment processes 171, 175 of the deployment system 170, which can be concurrently processed pursuant to respective interdependencies determining parallelism of the deployment processes 171, 175. Also because each of the deployment processes 171, 175 affects a certain logical component in the cloud computing environment 50, the change request tasks 131, 135 can concurrently change certain group of logical components in the cloud computing environment 50, even though the change request tasks 131, 135 had been initially sequential as steps to the change request 130.

Figure 6:
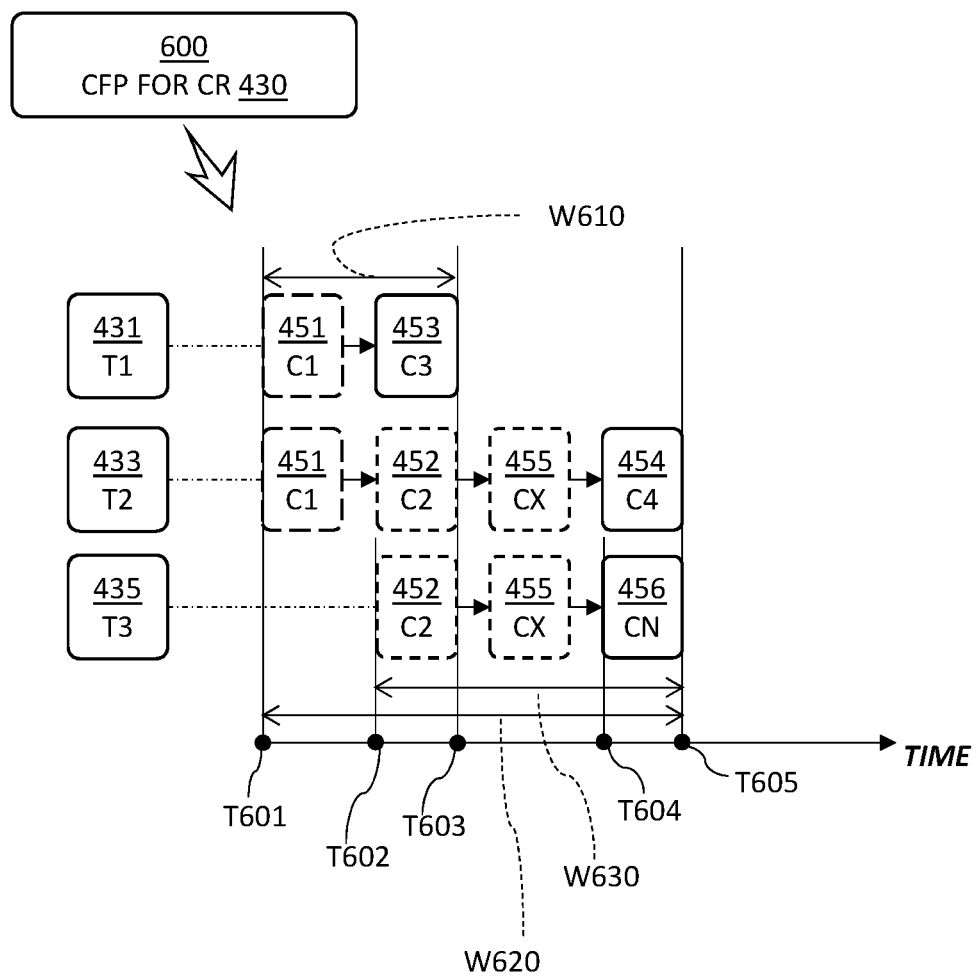
FIG. 6 depicts an exemplary instance of the change request fulfillment plan consistent with the examples shown in FIGS. 4 and 5, in accordance with one or more embodiments set forth herein.

An exemplary instance of the CFP 160 corresponding to the elements of FIGS. 4 and 5 is presented in FIG. 6 and corresponding description.

In block 260, the CM engine 120 executes the change request fulfillment plan 160 produced from block 250 by use of the deployment system 170 on the cloud computing environment 50, by performing the deployment processes 171, 175 of the deployment system 170 according to the change request fulfillment plan 160. Then, the CM engine 120 proceeds with block 270.

In block 270, the CM engine 120 monitors the cloud computing environment to which the CFP 160 previously had been and/or currently is being deployed. The CM engine 120 monitors and collects data similar to the learning phase information and updates the change request constraints 139 based on the information collected from the monitoring. Then, the CM engine 120 loops back to block 240 to retrain the CMM 150 with the updated change request constraints and other information on the impact of changes made by the change request 130.

In certain embodiments of the present invention, the CM engine 120 can monitor the cloud computing environment 50 by receiving a notification from an external system and/or entity with respect to an incident involving the cloud computing environment 50 and the operations/components affected by the change request 130. In such cases, the CM engine 120 modifies the CR constraints 139 and the CFP 160 on the fly in order to dynamically adjust the CR constraints 139 and the CFP 160 based on the notification.

Figure 3:
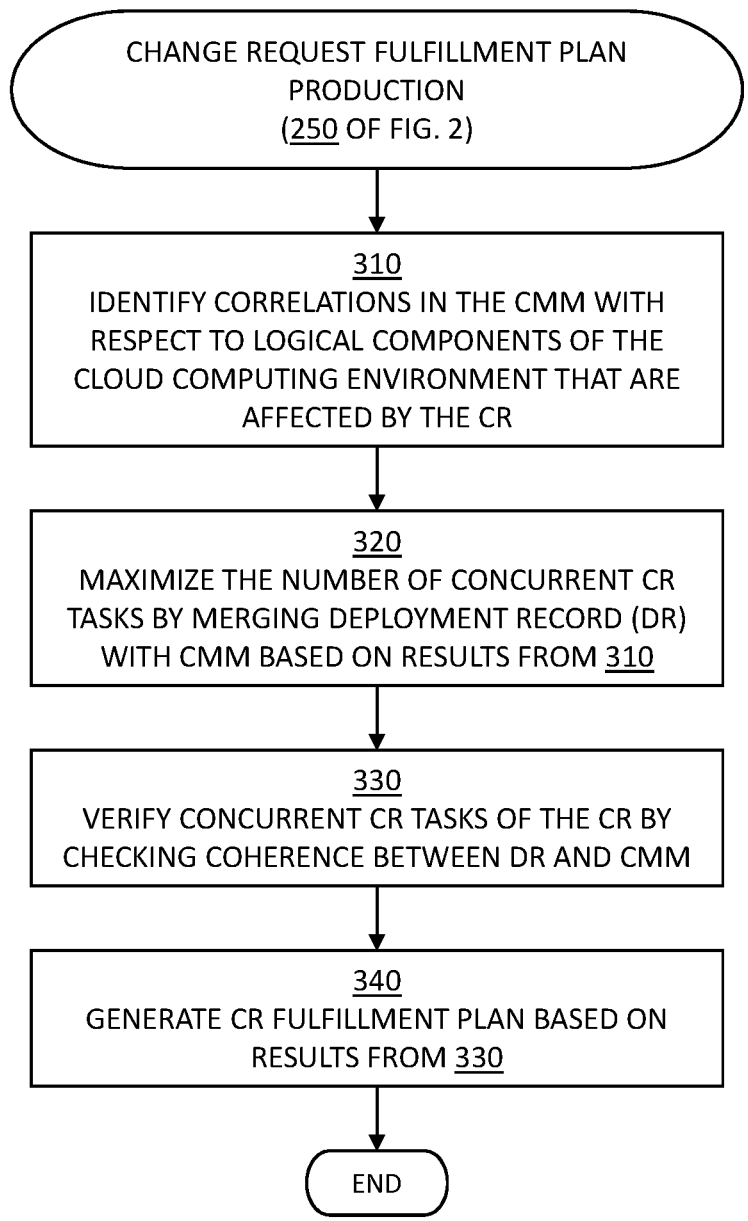
FIG. 3 depicts a flowchart of operations in producing the change request fulfillment plan, as performed by the change management engine in step 250 of FIG. 2, in accordance with one or more embodiments set forth herein.

FIG. 3 depicts a flowchart of operations in producing the change request fulfillment plan 160, as performed by the CM engine 120 in step 250 of FIG. 2, in accordance with one or more embodiments set forth herein.

In block 310, the CM engine 120 identifies correlations/interdependencies in the CMM 150 with respect to logical components of the cloud computing environment 50 that are affected by the change request 130. Then, the CM engine 120 proceeds with block 320.

In certain embodiments of the present invention, the CM engine 120 in block 310 identifies, from the CMM 150, the change request tasks 131, 135 from the change request 130, and identifies subsets of the deployment processes 171, 175 to be performed for each of the change request tasks 131, 135 from the deployment record 140. The CM engine 120 also identifies, from the CMM 150, respective sets of logical components in the cloud computing environment 50 that are affected by each of the subsets of the deployment processes 171, 175. The CM engine 120 combines the identified dependencies between the elements of the CMS 110 and the DS 170, and between the elements of the DS 170 and the cloud computing environment 50, in specifying the interdependencies in the CMM 150 that can contribute in producing the change request fulfillment plan 160. Examples of interdependencies in the CMM 150 that can be useful for the CFP 160 include, but are not limited to, a timeframe that disrupts the subscribed service 108 the least for the cloud customer 109, according to business hours of the cloud customer 109, exact identification of any particular virtual machine and the status of the identified virtual machine with respect to workload distribution, identification of a set of logical components that can be changed in parallel, identification of a sequence of logical components that should be changed in order. For example, maintenanceDuration in the CR constraints 139 is an estimation of time in which the change request 130 should be completed in order to ensure the least disruption on the subscribed service 109. In the same example, if value(maintenanceDuration)=3, then the subscribed service 108 can be down up to three (3) hours at a time, but no longer than three hours.

In certain embodiments of the present invention, the CM engine 120 identifies specifics of the logical components in the cloud computing environment 50 subject to the changes of the change request 130. For example, the CM engine 120 identifies the number of virtual machines that are grouped as worker VM in one instance of the cloud computing environment 50 that is subject to the changes of the change request 130. The CM engine 120 can subsequently take the number of worker VMs in a particular cloud computing environment into account in identifying correlation/interdependencies of the elements in the particular cloud computing environment as well as the interdependencies of the CMM 150.

As previously noted, one example of respective elements from the CMS 110, the DS 170, and the cloud computing environment 50 is presented in FIG. 4 and corresponding description. An exemplary instance of the CMM 150 corresponding to the elements of FIG. 4 is presented in FIG. 5 and corresponding description.

In block 320, the CM engine 120 maximizes the number of concurrent CR tasks 131, 135 by merging the deployment record 140 with the CMM 150, based on the interdependencies identified from block 310. Then, the CM engine 120 proceeds with block 330.

In certain embodiments of the present invention, the CM engine 120 checks the interdependencies identified in the elements of the CMS 110, the DS 170, and the cloud computing environment 50 for any update dependency between a pair of elements. An update dependency exists between a pair of elements when an update of one element should precede an update of the other element, that is, the order of updating the pair of elements is compulsory. The pair of elements having an update dependency cannot run in parallel. In the same embodiments as above, the CR tasks 131, 135 can be ordered according to the characteristics of the CR 130. An example of an update dependency between a pair of logical components in the cloud computing environment 50 is shown in FIG. 5.

In block 330, the CM engine 120 verifies the change request tasks 131, 135, or any other elements from the DS 170 and the cloud computing environment 50 that had been identified to be concurrent from block 320 by checking coherence between the deployment record 140 and the CMM 150 on the identified elements. If the CM engine 120 discovers any deployment issues and/or performance issues in running the concurrent elements identified from block 320, or the CM engine 120 finds no concurrent deployment record for the identified elements, then the CM engine 120 marks the elements identified to be concurrent from block 320 with the discovered issues, tags with an indication that the identified elements had not been previously deployed in parallel, looks up for any custom rule to handle concurrent elements that would be deployed for the first time, or even revokes the concurrency of the elements if applicable. Then, the CM engine 120 proceeds with block 340.

In certain embodiments of the present invention, the CM engine 120 searches the DR 140 for the deployed elements that had been identified as concurrent in block 320. If any concurrent elements are present in the DR 140, demonstrating that the concurrent elements had been previously deployed, the CM engine 120 further searches entries of performance metrics, incident logs, and any other record internal and/or external to the CMS 110 for information pertinent to the concurrent elements the DR 140 to check any actual issues in deployment by running the elements identified as concurrent in the CMM 150 simultaneously and/or any performance issues with changes made by processing the concurrent elements in parallel.

In block 340, the CM engine 120 generates the change request fulfillment plan 160 based on results from block 330, that is, the CFP 160 includes the greatest number of concurrent elements as identified from the CMM 150, to reduce the time required to make the change of the change request 130 to the minimum, and, as verified against the DR 140, to ensure that the change would be successful after the deployment. An exemplary instance of the CFP 150 corresponding to the example of FIGS. 4 and 5 is presented in FIG. 6 and corresponding description. Then, then CM engine 120 proceeds with block 260 of FIG. 2.

FIG. 4 depicts an exemplary instance 400 of respective elements from the CMS 110, the DS 170, and the cloud computing environment 50 of FIG. 1, in accordance with one or more embodiments set forth herein.

The exemplary instance 400 of the system 100 of FIG. 1 includes Change Request=FIREWALL UPDATE 430, that is, a change request to update a firewall for a cloud K 450, in the CMS 110. The CR 430 can be accomplished by performing three (3) change request tasks of T1=Change Password 431, T2=Change Router Configuration 433, and T3=Change Firewall 435, in that order, according to the change request constraints 139 corresponding to the CR 430.

According to information collected during the learning phase, the CR task T1 431 is non-disruptive for services on the cloud K 450, but the CR tasks T2 433 and T3 435 are disruptive for the services on the cloud K 450, particularly for any services utilizing network functionality.

In the DS 170, the exemplary instance 400 includes ten (10) deployment processes of Login 471, Set New Password 472, Verify New Password 473, Reboot VM 474, Test Acceptance 475, Logout 476, Update Router Configuration 477, Verify Router Operation 478, Update Firewall Rules 479, and Verify Firewall 480, with respect to the CR 430. The deployment processes 471 . . . 480 of the DS 170 are presented in no specific order.

The cloud K is an instance of the cloud computing environment 50 of FIG. 1, which provides Network Service 408 to Customer A 409. In the cloud K 450, six (6) logical components of C1 451, C2 452, C3 453, C4 454, CX 455, and CN 456 are present with respect to the CR 430. Similarly to the deployment processes of the DS 170, the logical components 451 . . . 456 are presented in no specific order.

FIG. 5 depicts an exemplary instance 500 of the change management meta model 150 corresponding to the elements shown in FIG. 4, in accordance with one or more embodiments set forth herein.

The change request tasks T1 431, T2 433, and T3 435 of the CR=FIREWALL UPDATE 430, are to be performed in order, as shown by arrows from T1 431 to T2 433, and from T2 433 to T3 435, in the CR 430. The change request constraints 139 specifies the sequential relations amongst the change request tasks T1 431, T2 433, and T3 435 of the CR 430, and the change request constraints 139 are included in the CMM 150.

The CMM 150 also includes, as specified by the change request constraints 139, that the CR task T1 431 is deployed by performing the deployment processes including Set New Password 472 and Verify New Password 473, that the CR task T2 433 is deployed by performing the deployment processes including Update Router Configuration 477 and Verify Router Operation 478, and that the CR task T3 435 is deployed by performing the deployment processes including Update Firewall Rules 479 and Verify Firewall 480. Other deployment processes can be further included in the list of deployment processes for respective CR tasks. For example, for any change with the system setting parameters such as the router configuration and/or the firewall rules, the subject logical component should be rebooted and tested if the new system setting parameters would take effect, as shown in the deployment processes Reboot VM 474 and Test Acceptance 475.

Running the deployment processes 472 and 473 to perform the CR task T1 431 would change the logical components C1 451 and C3 453, in an order beginning with the logical component C1 451 and subsequently the logical component C3 453, that is, (C1→C3) as shown.

Also, running the deployment processes 477 and 478 to perform the CR task T2 433 would change the logical components C1 451, C2 452, CX 455 and C4 454, in an order beginning with the logical component C1 451, followed by the logical component C2 452, then the logical component CX 455, and finally the logical component C4 454, that is, (C1→C2→CX→C3) as shown.

With respect to the CR task T3 435, running the deployment processes 479 and 480 accomplish the CR task T3 435 by changing the logical components C2 452, CX 455 and CN 456, in an order beginning with the logical component C2 452, and CX 455 next, and finally the logical component CN 456, that is, (C2→CX→CN) as shown.

The CMM 150 specifies an update dependency (C2→CX) 510 indicating that the logical component C2 452 should be updated prior to the logical component CX 455. A partial change sequence identical to the update dependency (C2→CX) 510 for the two logical components C2 452 and CX 455 are to be performed in both the CR task T2 433 and the CR task T3 435. It should be noted that the CMM 150 does not specify any other dependencies, indicating that there is no dependencies between logical components of C2 452 and C3 453, C3 453 and C4 454, or C4 454 and CN 456.

FIG. 6 depicts an exemplary instance 600 of the change request fulfillment plan consistent with the examples shown in FIGS. 4 and 5, in accordance with one or more embodiments set forth herein.

The exemplary CFP 600 for the CR 430 is produced in block 250 of FIG. 2, and more specifically in block 340 of FIG. 3, based on the exemplary instance of the CMM 500 shown in FIG. 5.

The logical component, for example, a virtual machine, C1 451 is subject to changes by both the CR task T1 431 and the CR task T2 433. By updating the logical component C1 451 concurrently by the CR task T1 431 as well as the CR task T2 433, beginning at Time T601, the exemplary CFP 600 would not need to update and reboot the logical component C1 451 twice for each CR task C1 and C2, but only need to make respective changes by the CR task T1 431 and the CR task T2 433 and reboot the logical component C1 451 once to complete the changes. As booting up any logical component would take a significant time, the exemplary CFP 600 can reduce the amount of time required to complete the same change request significantly.

Each cloud customer of the cloud computing environment 50 can run a few to several tens of virtual machines, each running up to a couple of hundred applications, which respectively performing and/or supporting certain subscribed services of the cloud computing environment 50.

Accordingly, minimizing the maintenance downtime for each virtual machine would contribute greatly in optimizing service disruption. Particularly when a subject virtual machine has a role greater than average in servicing the Network Service 408 of FIG. 4, implementing change requests without optimizing the maintenance downtime would impact service quality negatively.

In the CR constraints for the CR 430, the CR task T1 431 is estimated to be performed in a window of time, Window W610. After beginning at Time T601, the CR task T1 431 would be completed at Time(T601+W610)=T603.

The CR task T2 433 changes the logical component C2 452 subsequent to changing the logical component C1 451. Because there is no dependency between the logical components C2 452 and C3 453, the CR task T2 433 can continue with the logical component C2 452 simultaneously with the CR task T1 431 continuing with the logical component C3 453. Also, as in the case of the logical component C1 451, both the CR task T2 433 and the CR task T3 435 can concurrently update the logical component C2 452. Accordingly, the CR task T1 431 begins working on the logical component C3 453 at Time T602, and both the CR task T2 433 and the CR task T3 435 begin working on the logical component C2 452 concurrently at Time T602 as well as shown.

For the CR task T2 433 to complete, the logical components of C1 451, C2 452, CX 455, and C4 454 are to be changed in that order. In the CR constraints for the CR 430, the CR task T2 433 is estimated to be performed in a window of time, Window W620. After beginning at Time T601, the CR task T2 433 would be completed at Time(T601+W620)=T605.

Because there is no dependency between the logical components C4 454 and CN 456, the CR task T2 433 can continue with the logical component C4 454 simultaneously with the CR task T3 435 continuing with the logical component CN 456, at Time T604.

Similarly for the CR task T3 435 to complete, the logical components of C2 452, CX 455, and CN 456 are to be changed in that order. In the CR constraints for the CR 430, the CR task T3 435 is estimated to be performed in a window of time, Window W630. After beginning at Time T602, the CR task T3 435 would be completed at Time(T602+W630)=T605.

Without the CFP 600 for the CR 430, the CR tasks of T1 431, T2 433, and T3 435 would be performed in sequence, which will begin at Time T601 and end at Time (T601+W610+W620+W630), in addition to twice as much time as consumed for rebooting time for the logical components C1 451, C2 452, and CX 455. By using the CFP 600 based on the CMM 500, the CR 430 is performed in a much shorter time, which begins at Time T601 and end at Time T605 for a total duration of Window W620.

Certain embodiments of the present invention automatically optimize an IT change management process of one or more cloud computing environment by building and retraining a machine learning model referred to as a change management meta model, which is based on change request constraints compiled from comprehensive information about a change request and all elements involved in the change management process as being obtained by data mining. The change request constraints specify interdependencies amongst elements of respective subsystems of the change management system, particularly with respect to parallelism in completing change request tasks and relevant logical components in the cloud computing environment as well as time windows for the change request tasks estimated for respective maintenance durations within which a requested change can be deployed to the cloud computing environment. Certain embodiments of the present invention automatically devises a change request fulfillment plan based on the change management meta model in a manner to maximize the number of changes in unit time by deploying the change request tasks concurrently to a number of logical components of the cloud computing environment that are not interdependent. By maximizing the concurrency in changes made to individual logical components, certain embodiments of the present invention can minimize the maintenance duration by removing repeated rebooting and/or waiting when there is no interdependency reason. Consequently, certain embodiments of the present invention can minimize service disruption on the cloud customers serviced by the cloud computing environment, which is caused by a prolonged maintenance window. Certain embodiments of the present invention further monitors performance metrics on the cloud computing environment subsequent to the deployment of the change by use of the change request fulfillment plan such that the monitored data are used for retraining the change management meta model, used for adjusting the change constraints for the change management meta model, and/or used for dynamically updating the change request fulfillment plan for an ongoing change. Certain embodiments of the present invention may be implemented as a part of cloud management platform indicating a software suite and/or by use of a cloud platform/data center in various types including a Software-as-a-Service (SaaS), Platform-as-a-Service (PaaS), Database-as-a-Service (DBaaS), and combinations thereof based on types of subscription. The configuration profile automation service can be provided for subscribed business entities/vendors of software applications in need from any location in the world.

Figure 7:
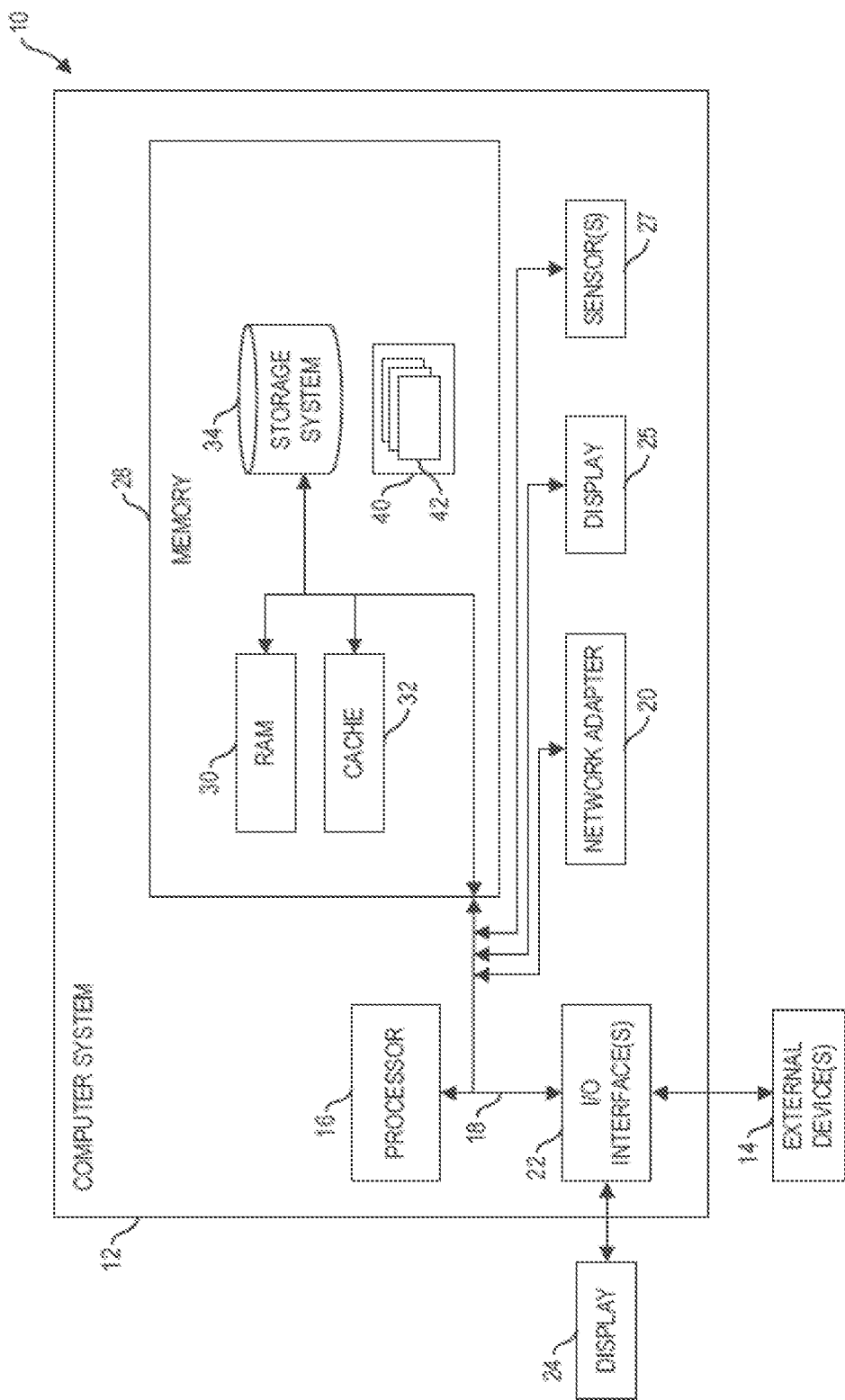
FIG. 7 depicts a cloud computing node according to an embodiment of the present invention.
Figure 8:
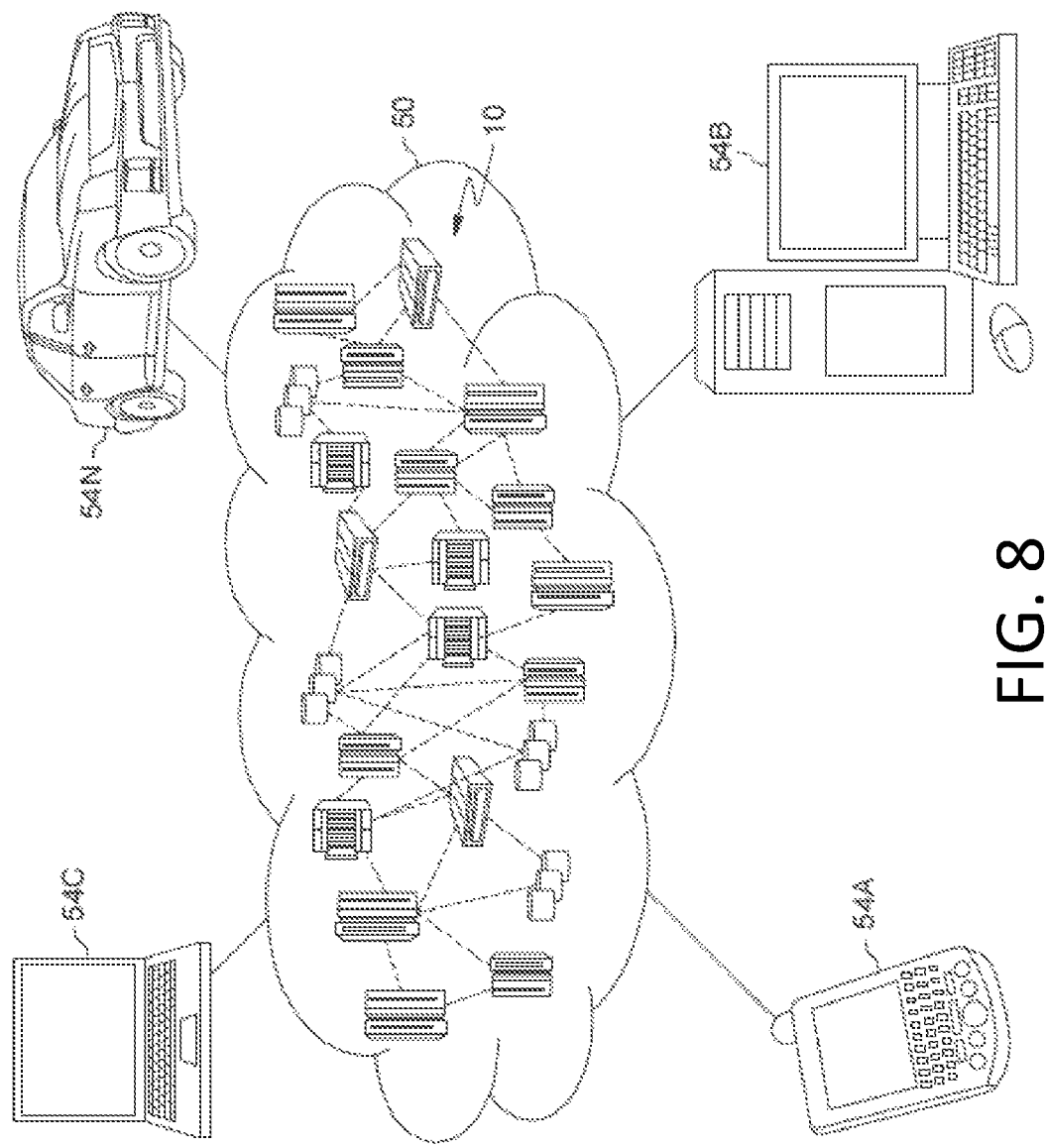
FIG. 8 depicts a cloud computing environment according to an embodiment of the present invention.
Figure 9:
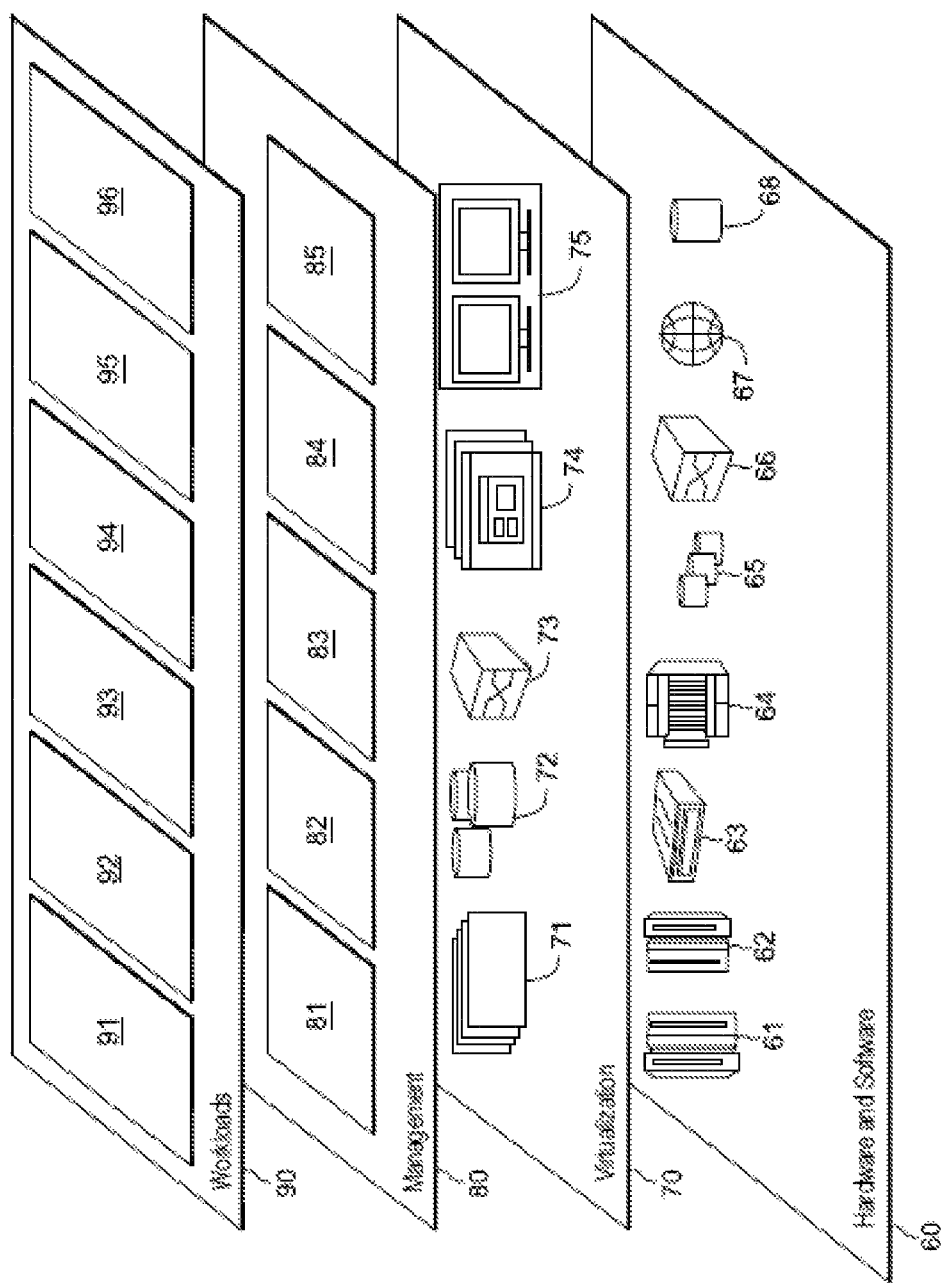
FIG. 9 depicts abstraction model layers according to an embodiment of the present invention.

FIGS. 7-9 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the change management system 110 and the change management engine 120 of FIG. 1, respectively. Program processes 42, as in the change management system 110 and the change management engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for any subscribed service including the change management process optimization service 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    building, by one or more processor, a change management meta model on interdependencies between a change request comprising one or more change request task and one or more deployment process respective to each of the one or more change request task, and on dependencies of one or more logical component of a computing environment to the one or more deployment process based on change request constraints by use of machine learning;
    producing, by the one or more processor, a change request fulfillment plan that minimizes a maintenance window indicating an amount of time for deploying the one or more change request task to the one or more logical component via the one or more deployment process based on the interdependencies and the dependencies modeled in the change management meta model; and
    feeding, by the one or more processor, performance metrics on operations of the one or more logical component subsequent to deploying the one or more change request task into the change request constraints.

2. The computer implemented method of claim 1, further comprising:
    prior to the feeding, running the one or more deployment process corresponding to the one or more change request task as specified in the change request fulfillment plan.

3. The computer implemented method of claim 1, wherein the one or more logical component of the computing environment services one or more customer with one or more subscribed service provided by the computing environment, and wherein the one or more subscribed service can be disrupted during the maintenance window, depending on characteristics of each of the one or more change request task.

4. The computer implemented method of claim 1, further comprising:
    prior to the building, collecting data on the change request, the one or more change request task, the one or more deployment process corresponding to each of the one or more change request task, and the one or more logical component corresponding to each of the one or more change request task, by use of data mining on sources including a deployment record of past deployments, the one or more logical component, and any accessible external computing environment.

5. The computer implemented method of claim 1, further comprising:
    subsequent to the feeding, retraining the change management meta model with the change request constraints updated with the performance metrics from the feeding such that the interdependencies and the dependencies of the change management meta model can be dynamically adjusted for accuracy.

6. The computer implemented method of claim 1, further comprising:
    subsequent to the feeding, adjusting the change request fulfillment plan for the change that is ongoing based on the performance metrics from the feeding such that a remainder of the one or more change request task in the change can be dynamically adjusted for accuracy.

7. The computer implemented method of claim 1, the producing comprising:
    identifying any correlation in the change management meta model with respect to each of the one or more logical component that can be affected by the change, wherein the correlation including the interdependencies and the dependencies modeled in the change management meta model;
    maximizing a number of the one or more change request task that can be concurrently deployed to each of the one or more logical component by merging a deployment record of past deployments relevant to each of the one or more logical component; and
    generating the change request fulfillment plan by scheduling all change request tasks accounted in the number of the one or more change request task to run concurrently without restarting a logical component subject to the all change request tasks.

8. A computer program product comprising:
    a computer readable storage medium readable by one or more processor and storing instructions for execution by the one or more processor for performing a method comprising:
        building a change management meta model on interdependencies between a change request comprising one or more change request task and one or more deployment process respective to each of the one or more change request task, and on dependencies of one or more logical component of a computing environment to the one or more deployment process based on change request constraints by use of machine learning;
        producing a change request fulfillment plan that minimizes a maintenance window indicating an amount of time for deploying the one or more change request task to the one or more logical component via the one or more deployment process based on the interdependencies and the dependencies modeled in the change management meta model; and feeding performance metrics on operations of the one or more logical component subsequent to deploying the one or more change request task into the change request constraints.

9. The computer program product of claim 8, further comprising:
prior to the feeding, running the one or more deployment process corresponding to the one or more change request task as specified in the change request fulfillment plan.

10. The computer program product of claim 8, wherein the one or more logical component of the computing environment services one or more customer with one or more subscribed service provided by the computing environment, and wherein the one or more subscribed service can be disrupted during the maintenance window, depending on characteristics of each of the one or more change request task.

11. The computer program product of claim 8, further comprising:
prior to the building, collecting data on the change request, the one or more change request task, the one or more deployment process corresponding to each of the one or more change request task, and the one or more logical component corresponding to each of the one or more change request task, by use of data mining on sources including a deployment record of past deployments, the one or more logical component, and any accessible external computing environment.

12. The computer program product of claim 8, further comprising:
subsequent to the feeding, retraining the change management meta model with the change request constraints updated with the performance metrics from the feeding such that the interdependencies and the dependencies of the change management meta model can be dynamically adjusted for accuracy.

13. The computer program product of claim 8, further comprising: subsequent to the feeding, adjusting the change request fulfillment plan for the change that is ongoing based on the performance metrics from the feeding such that a remainder of the one or more change request task in the change can be dynamically adjusted for accuracy.

14. The computer program product of claim 8, the producing comprising:
identifying any correlation in the change management meta model with respect to each of the one or more logical component that can be affected by the change, wherein the correlation including the interdependencies and the dependencies modeled in the change management meta model;
maximizing a number of the one or more change request task that can be concurrently deployed to each of the one or more logical component by merging a deployment record of past deployments relevant to each of the one or more logical component; and
generating the change request fulfillment plan by scheduling all change request tasks accounted in the number of the one or more change request task to run concurrently without restarting a logical component subject to the all change request tasks.

15. A system comprising:
a memory;
one or more processor in communication with the memory; and program instructions executable by the one or more processor via the memory to perform a method comprising:
building a change management meta model on interdependencies between a change request comprising one or more change request task and one or more deployment process respective to each of the one or more change request task, and on dependencies of one or more logical component of a computing environment to the one or more deployment process based on change request constraints by use of machine learning;
producing a change request fulfillment plan that minimizes a maintenance window indicating an amount of time for deploying the one or more change request task to the one or more logical component via the one or more deployment process based on the interdependencies and the dependencies modeled in the change management meta model; and
feeding performance metrics on operations of the one or more logical component subsequent to deploying the one or more change request task into the change request constraints.

16. The system of claim 15, further comprising: prior to the feeding, running the one or more deployment process corresponding to the one or more change request task as specified in the change request fulfillment plan, wherein the one or more logical component of the computing environment services one or more customer with one or more subscribed service provided by the computing environment, and wherein the one or more subscribed service can be disrupted during the maintenance window, depending on characteristics of each of the one or more change request task.

17. The system of claim 15, further comprising:
prior to the building, collecting data on the change request, the one or more change request task, the one or more deployment process corresponding to each of the one or more change request task, and the one or more logical component corresponding to each of the one or more change request task, by use of data mining on sources including a deployment record of past deployments, the one or more logical component, and any accessible external computing environment.

18. The system of claim 15, further comprising:
subsequent to the feeding, retraining the change management meta model with the change request constraints updated with the performance metrics from the feeding such that the interdependencies and the dependencies of the change management meta model can be dynamically adjusted for accuracy.

19. The system of claim 15, further comprising: subsequent to the feeding, adjusting the change request fulfillment plan for the change that is ongoing based on the performance metrics from the feeding such that a remainder of the one or more change request task in the change can be dynamically adjusted for accuracy.

20. The system of claim 15, the producing comprising:
identifying any correlation in the change management meta model with respect to each of the one or more logical component that can be affected by the change, wherein the correlation including the interdependencies and the dependencies modeled in the change management meta model;
maximizing a number of the one or more change request task that can be concurrently deployed to each of the one or more logical component by merging a deployment record of past deployments relevant to each of the one or more logical component; and generating the change request fulfillment plan by scheduling all change request tasks accounted in the number of the one or more change request task to run concurrently without restarting a logical component subject to the all change request tasks.

\* \* \* \* \*